United States Patent
Thomas et al.

(10) Patent No.: US 9,914,533 B2
(45) Date of Patent: Mar. 13, 2018

(54) IN-WING DEVICE RETENTION (71) Applicant: Sikorsky Aircraft Corporation, Stratford, CT (US)

(72) Inventors: Justin Thomas, New Haven, CT (US); Eric L. Nussenblatt, Stamford, CT (US); Ryan T. Casey, San Diego, CA (US); Eric S. Parsons, New Haven, CT (US); David H. Hunter, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 110 days.

(21) Appl. No.: 14/097,478

(22) Filed: Dec. 5, 2013

(65) Prior Publication Data

US 2015/0158573 A1    Jun. 11, 2015

(51) Int. Cl.
   - B64D 45/00 (2006.01)
   - B64C 27/00 (2006.01)
   - B64C 27/473 (2006.01)

(52) U.S. Cl.
   CPC .......... B64C 27/006 (2013.01); B64C 27/473 (2013.01); B64D 45/00 (2013.01); *Y10T 29/49337* (2015.01); *Y10T 29/49826* (2015.01)

(58) Field of Classification Search
   CPC .......................................................... B64C 1/12
   USPC ............................................. 244/123.14, 131
   See application file for complete search history.

(56) References Cited

U.S. PATENT DOCUMENTS

| | | | | |
|---|---|---|---|---|
| 2,467,031 A * | 4/1949 | Hess et al. | ................ | 416/229 R |
| 5,176,339 A * | 1/1993 | Schmidt | .......................... | 244/54 |
| 5,273,398 A * | 12/1993 | Reinfelder et al. | ........... | 416/144 |
| 5,641,133 A * | 6/1997 | Toossi | ........................ | 244/17.27 |
| 5,975,465 A * | 11/1999 | Donal et al. | ................ | 244/123.4 |
| 6,196,066 B1 | 3/2001 | Barbier | | |
| 7,097,427 B2 * | 8/2006 | Kuhns et al. | ................. | 416/144 |
| 7,118,343 B2 * | 10/2006 | Loftus et al. | ................. | 416/145 |
| 7,607,614 B2 * | 10/2009 | Rouyre | ....................... | 244/131 |
| 8,267,661 B2 | 9/2012 | Lamborn et al. | | |
| 8,756,792 B2 * | 6/2014 | Boyl-Davis et al. | ........... | 29/592 |

* cited by examiner

Primary Examiner — Brian M O'Hara
Assistant Examiner — Keith L Dixon
(74) Attorney, Agent, or Firm — Cantor Colburn LLP (57) ABSTRACT

A method of forming an in-wing device-retention assembly includes inserting a first plate into a wing, the wing having a wide end and a narrow end. The method includes inserting a second plate into the wing, inserting a wedge plate into the wing and positioning the wedge plate between the first plate and the second plate, and applying a force to the wedge plate in a direction toward the narrow end to fix the first plate, the second plate and the wedge plate within the wing.

16 Claims, 8 Drawing Sheets

IN-WING DEVICE RETENTION

BACKGROUND OF THE INVENTION

The subject matter disclosed herein relates to in-wing structures, and in particular to a multi-piece in-wing device-retaining apparatus.

Devices, such as sensors, may be placed in a vehicle wing to detect characteristics of the vehicle. Other devices, such as weights for balance, or any other type of device may be placed in the vehicle wing to perform a function during vehicle operation. For example, in a rotary-wing aircraft such as a helicopter, a sensor may be placed in the rotor blades to detect flight characteristics of the rotor blades. In a conventional in-wing device-retention cup, a hole is drilled into one side of the wing and material is removed from an inner surface of an opposite side of the wing to form a recess in the opposite side of the wing. A cup is inserted into the wing, and a base of the cup is positioned in the recess of the inner surface of the wing. However, with the conventional arrangement, material is removed from the wing, which may weaken the wing, or may limit the portions of the wing that may have a sensor or other device positioned therein.

BRIEF DESCRIPTION OF THE INVENTION

According to one aspect of the invention, a method of forming an in-wing device-retention assembly includes inserting a first plate into a wing, the wing having a wide end and a narrow end. The method includes inserting a second plate into the wing, inserting a wedge plate into the wing and positioning the wedge plate between the first plate and the second plate, and applying a force to the wedge plate in a direction toward the narrow end to fix the first plate, the second plate and the wedge plate within the wing.

According to another aspect of the invention, an in-wing device-retention assembly includes a first plate, a second plate, and a wedge plate. The wedge plate is configured to be positioned between the first plate and the second plate in a cavity defined by a wall structure of a wing. The wedge plate is configured to fix the first plate, the second plate and the wedge plate in the wing.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Conventional aircraft wings require drilling into material inside the wing to position a cup in the wing. For example, a hole may be drilled through one side of a rotor blade and a recess partially drilled into an inside surface of the opposite wall of the rotor blade. A cup or retaining structure to hold a sensor is then positioned in the hole and recess. Embodiments of the invention relate to a multi-piece in-wing device-retention assembly that may be inserted into an end of a hollow wing.

Figure 1:
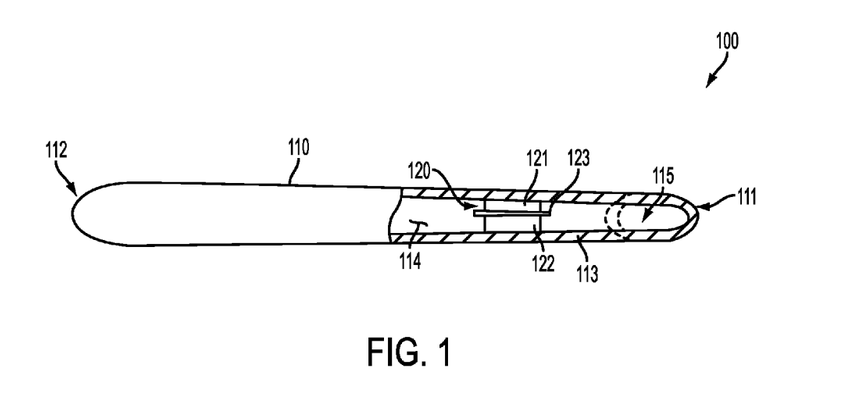
FIG. 1 illustrates a wing assembly according to an embodiment of the invention.

FIG. 1 illustrates a vehicle wing assembly 100 according to an embodiment of the invention. The assembly 100 includes a wing 110 and an in-wing device-retention assembly 120 located inside the wing 110. The wing 110 may be any type of vehicle wing. In one embodiment, the wing 110 is a rotary wing, such as a rotor blade of a helicopter.

The wing 110 includes a first end 111 and a second end 112. In one embodiment, the first end 111 is narrower than the second end 112, or the first end 111 has a smaller cross-section area than the second end 112. The wing 110 is defined by the wall structure 113. The wall structure 113 is hollow and defines a cavity 114. The in-wing device-retention assembly 120 is located in the cavity 114. The in-wing device-retention assembly 120 includes multiple pieces stacked on top of each other. In particular, the in-wing device-retention assembly 120 includes a first plate 121, a second plate 122 and a wedge plate 123 positioned between the first and second plates 121 and 122.

In one embodiment, the first plate 121, second plate 122 and wedge plate 123 are inserted into an opening 115 at the first end 111 of the wing 110. In particular, the first plate 121, second plate 122 and wedge plate 123 may be inserted into the opening 115 of the first end 111, and a force may be applied to the wedge plate 123 in the direction of the first end 111 to fix the in-wing device-retention structure 120 in position in the wing 110. The in-wing device-retention assembly 120 will be described in further detail with reference to FIGS. 2 to 5.

Figure 2:
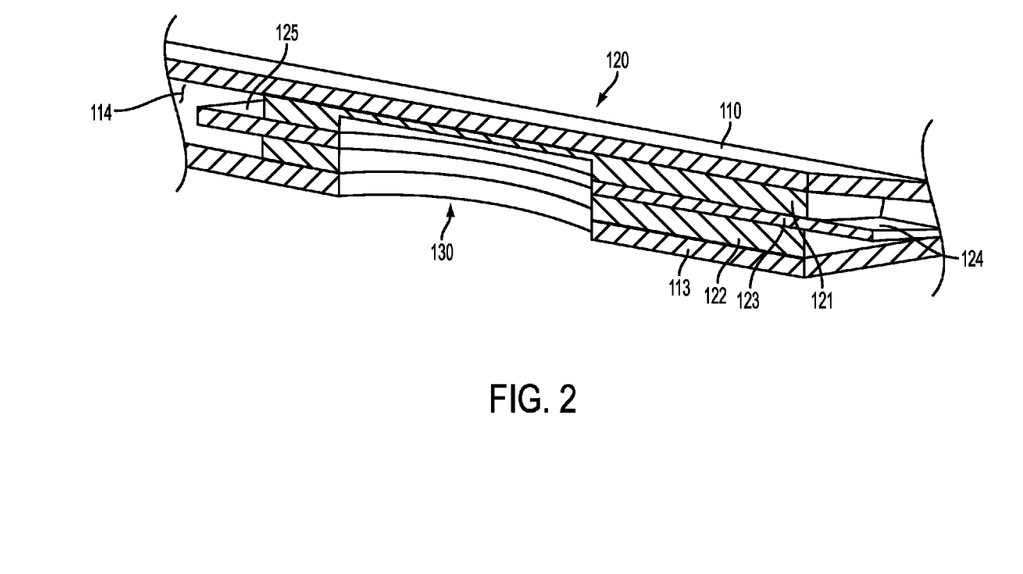
FIG. 2 illustrates a cross-section perspective view of a portion of a wing assembly according to an embodiment of the invention.

FIG. 2 illustrates a cross-sectional perspective view of the in-wing device-retention assembly 120 according to an embodiment of the invention. The in-wing device-retention assembly 120 includes the first plate 121, the second plate 122 and the wedge plate 123. The in-wing device-retention assembly 120 is positioned in the cavity 114 of the wing 110. The wedge plate 123 is positioned between the first and second plates 121 and 122 and fixes the in-wing device-retention assembly 120 in position in the wing 110. The first plate 121 is adjacent to one side of the wing 110, the second plate 122 is adjacent to an opposite side of the wing 110 and the wedge plate 123 is positioned between the first plate 121 and the second plate 122.

In one embodiment, the first and second plates 121 and 122, the wedge plate 123 and a hole in the wall structure 113 define a cavity 130. The cavity 130 may be a cylindrical shape or any other desired shape to receive a device, such as a sensor. In one embodiment, the wedge plate 123 is longer than the first and second plates 121 and 122, such that the wedge plate 123 includes one or both of a first protruding portion 124 and a second protruding portion 125 protruding past the ends of the first and second plates 121 and 122.

Figure 3A:
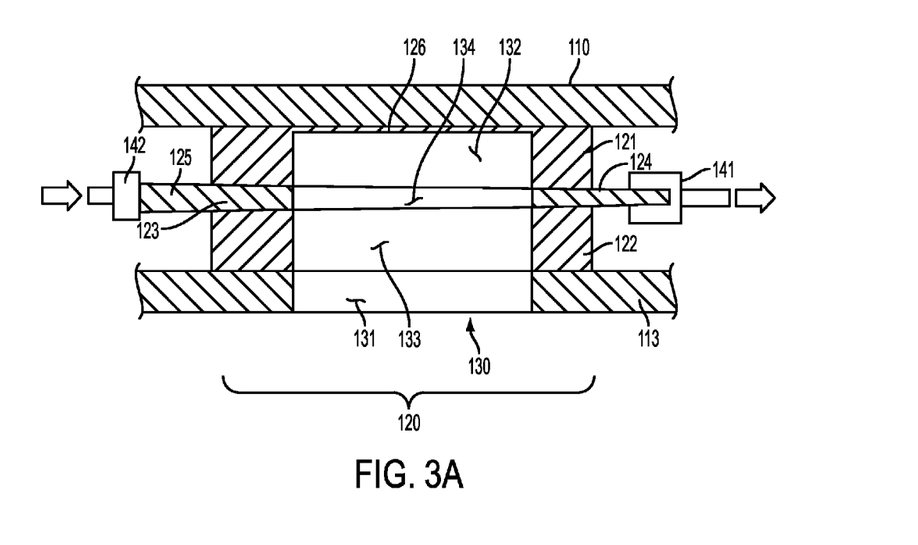
FIG. 3A illustrates a cross-section view of a device-retention assembly according to an embodiment of the invention.

FIG. 3A illustrates a cross-section view of an in-wing device-retention assembly 120 according to an embodiment of the invention. As illustrated in FIG. 3A, the wedge plate 123 is inserted between the first plate 121 and the second plate 122. A force is applied to the wedge plate 123 in a direction of the first end 111 of the wing 110, and in particular, in a direction from a wider portion of the wing 110 to a narrower portion of the wing 110. As the wedge plate 123 is moved from the wider portion of the wing 110 to the narrower portion of the wing 110, the wedge plate 123 exerts a force against the first and second plates 121 and 122 that increases as the wedge plate 123 is moved toward the narrower portion of the wing 110. The first and second plates 121 and 122, in turn, apply a force against the wall structure 113 of the wing 110 which fix the plates 121, 122 and 123 in position within the cavity 114 of the wing 110.

In addition, in one embodiment, an adhesive or other fixing material is applied to the first and second plates 121 and 122 to fix the first and second plates 121 and 122 to the wall structure 113 of the wing 110.

In one embodiment, a force is applied to the wedge plate 123 by applying a pulling mechanism 141 to the first protruding portion 124 of the wedge plate 123. The pulling mechanism 141 grips the first protruding portion 124, or may be attached to the first protruding portion 124, and pulls on the wedge plate 123 towards the first end 111, or in a direction from a wide end of the wing 110 to the narrower end of the wing 110.

In another embodiment, a force is applied to the wedge plate 123 by applying a pushing mechanism 142 to the second protruding portion 125 of the wedge plate 123. The pushing mechanism 142 pushes on the second protruding portion 125, or may be attached to the second protruding portion 125, and pushes on the wedge plate 123 towards the first end 111, or in a direction from a wide end of the wing 110 to the narrower end of the wing 110.

The first plate 121, second plate 122, wedge plate 123 and wall structure 113 of the wing 110 may form the cavity 130. In particular, an opening 131 is formed in one side of the wall structure 113; a second cavity 132 is formed in the first plate 121; a third cavity 133 is formed in the second plate 122; and a fourth cavity may be formed in the wedge plate 134. In one embodiment, the second cavity 132 does not extend through the first plate 121; instead, the first plate 121 includes a wall 126 that defines the base of the cavity 130.

Figure 3B:
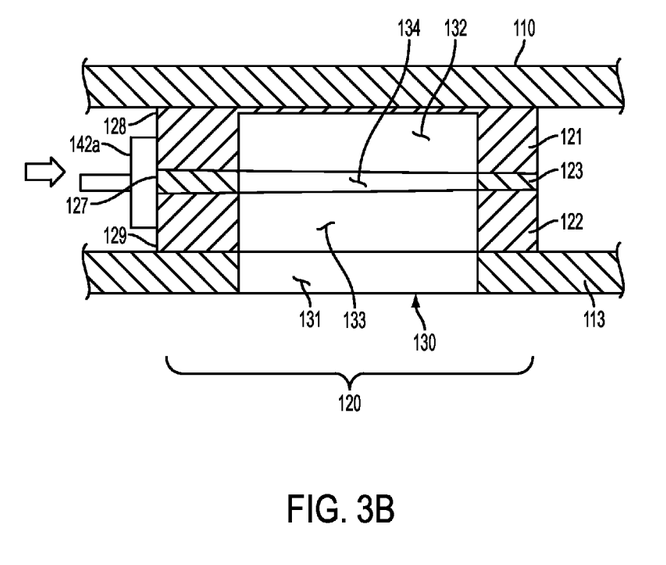
FIG. 3B illustrates a cross-section view of a device-retention assembly according to another embodiment of the invention.

FIG. 3B illustrates positioning of the in-wing device-retention assembly 120 according to another embodiment of the invention. In the embodiment illustrated in FIG. 3B, the wedge plate 123 is configured such that when the outer surface 127 of the wedge plate 123 is flush with the outer surfaces 128 and 129 of the first and second plates 121 and 122, the cavities 131 to 134 are aligned to form the device-retention cavity 130. In the embodiment illustrated in FIG. 3B, the first plate 121, the second plate 122 and the wedge plate 123 may be pushed towards the first end 111 of the wing 110 by the pushing mechanism 142a.

Figure 3C:
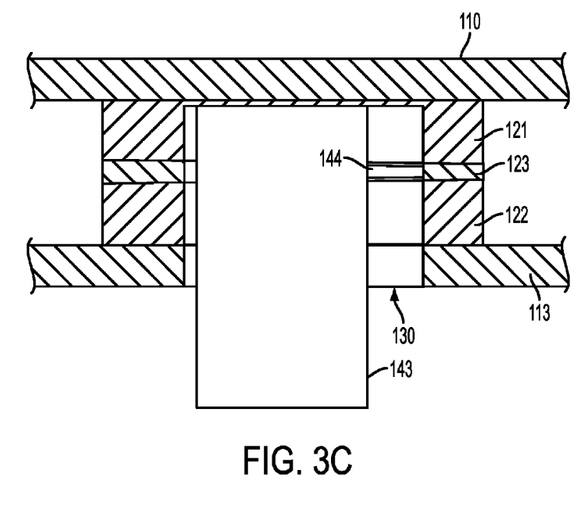
FIG. 3C illustrates a cross-section view of a device-retention assembly according to another embodiment of the invention.

FIG. 3C illustrates positioning of the in-wing device-retention assembly 120 according to another embodiment of the invention. In the embodiment illustrated in FIG. 3C, a pushing mechanism 143 is inserted into the cavity 130 to apply force to an inside surface of the wedge plate 123. While FIG. 3C illustrates a pushing mechanism 143 having a protrusion 144 to apply force to the inside surface of the wedge plate 123, in an alternative embodiment a protrusion of the pushing mechanism 143 may have a width sufficient to push against the inside surfaces of each of the first plate 121, the second plate 122 and the wedge plate 123 simultaneously. In embodiments of the invention, the wedge plate 123 may be positioned within the cavity 114 by one of the pulling mechanism 141, the pushing mechanism 142 or 142a, or the pushing mechanism 143. In addition, the wedge plate 123 may be positioned within the cavity 114 by any combination of the pulling mechanism 141 and the pushing mechanisms 142 or 142a and 143.

Figure 4A:
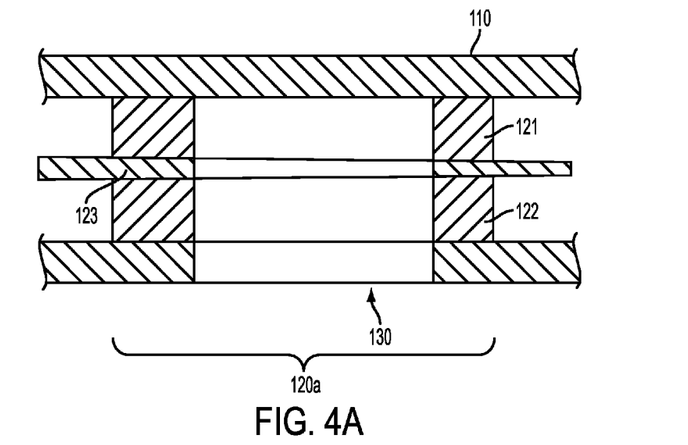
FIG. 4A illustrates a cross-section view of a device-retention assembly according to an embodiment of the invention.
Figure 4B:
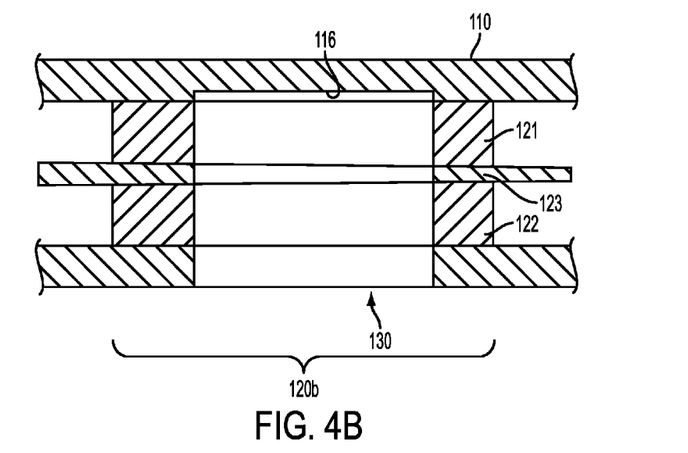
FIG. 4B illustrates a cross-section view of a device-retention assembly according to another embodiment of the invention.
Figure 4C:
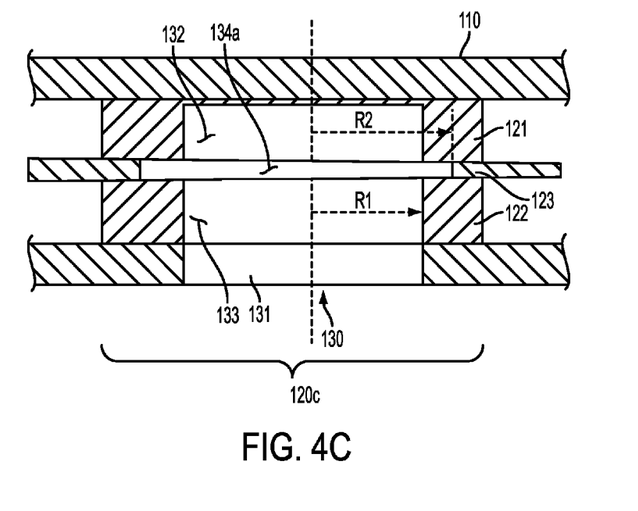
FIG. 4C illustrates a cross-section view of a device-retention assembly according to another embodiment of the invention.

FIGS. 4A to 4C illustrate additional embodiments of the invention. Referring to FIG. 4A, the first plate 121 may be formed without the wall 126, such that the cavity 132 extends through the entire first plate 121 and the wall structure 113 defines the base of the device-retention cavity 130.

Referring to FIG. 4B, a recess 116 may be formed in the wall structure 113 of the wing to form the base of the device-retention cavity 130. Referring to FIG. 4C, an opening 134a formed in the wedge plate 123 may have a diameter larger than the diameter of the opening 133 and the cavity 132. In other words, the radius R1 is less than the radius R2. In such an embodiment, the position of the wedge plate 123 may be adjusted relative to the position of the first plate 121 and the second plate 122 to increase or decrease the force exerted by the first and second plates 121 and 122 on the wall structure 113 while maintaining the capacity of the device-retention cavity 130 to receive a device. In other words, adjusting the lateral direction of the wedge plate 123 does not result in a portion of the wedge plate 123 protruding into the device-retention cavity 130.

In one embodiment, the first to fourth cavities 131 to 134 are formed in the wall structure 113, the first plate 121, the second plate 122 and the wedge plate 123 prior to inserting the first plate 121, the second plate 122 and the wedge plate 123 into the wing 110. In another embodiment, the first plate 121, the second plate 122 and the wedge plate 123 are inserted into the wing 110 prior to forming the openings 131, 132, 133 and 134 in the wall structure 113, the first plate 121, the second plate 122 and the wedge plate 123. Once the force is applied to the wedge plate 123 to position the first plate 121, second plate 122 and wedge plate 123 within the wing 110, a hole may be drilled in the wing 110 to form the device-retention cavity 130 in the first plate 121, second plate 122, wedge plate 123 and wing structure 113.

Figure 5:
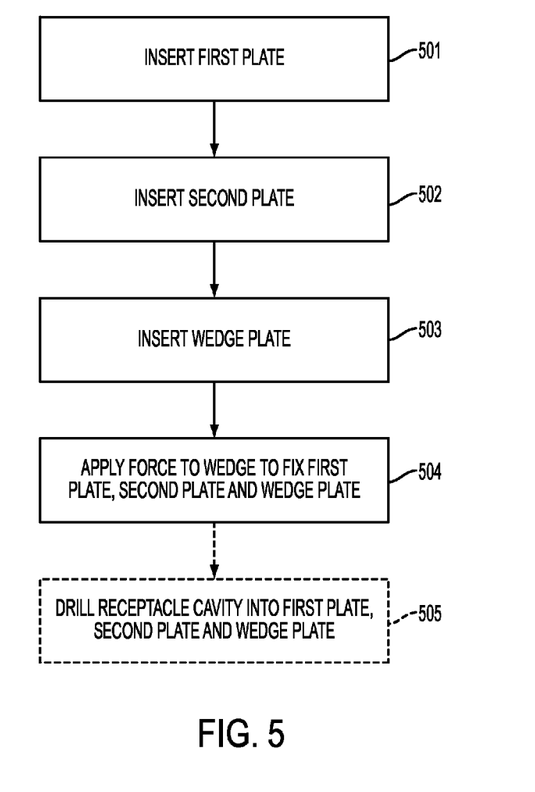
FIG. 5 is a flowchart of a method of forming an in-wing device-retention assembly according to an embodiment of the invention.

FIG. 5 is a flowchart of a method according to an embodiment of the invention. In block 501, the first plate of the in-wing device-retention assembly is inserted into a wing. In one embodiment, the wing has a wide end and a narrow end, and the wing tapers from the wide end to the narrow end. The first plate may be inserted into the narrow end of the wing. In block 502, the second plate is inserted into the wing. The second plate may be inserted into the narrow end of the wing. In block 503, a wedge plate may be inserted in to the wing and positioned between the first plate and the second plate. The wedge plate may be inserted into the narrow end of the wing.

In embodiments of the invention, the wedge plate is inserted between the first plate and the second plate. The wedge plate has a wide end and a narrow end, and the wedge plate tapers from the wide end to the narrow end. The wedge is positioned between the first plate and the second plate with the wide end of the wedge facing the wide end of the wing and the narrow end of the wedge facing the narrow end of the wing.

In block 504, a force is applied to the wedge plate to move the wedge plate in the direction of the narrow end of the wing. The application of the force to the wedge plate may include applying force only to the wedge plate, or it may include applying a force to one or more of the wedge plate, the first plate and the second plate. In one embodiment, applying the force to the wedge plate includes inserting a pulling mechanism into the narrow end of the wing, fixing the pulling mechanism to a protruding portion of the wedge plate, and pulling the wedge plate towards the first end of the wing. In another embodiment, applying the force to the wedge plate includes inserting a pushing mechanism into the wide end of the wing and pushing on the wide end of the wedge plate.

In yet another embodiment, applying the force to the wedge plate includes inserting a pushing mechanism into a device-retention cavity formed by openings in the first plate, the second plate, the wedge plate and one side of the wing, and pushing on an inside surface of the wedge plate toward the narrow side of the wing.

In one embodiment of the invention, cavities are formed in the first plate, the second plate and the wedge plate prior to inserting the first plate, the second plate and the wedge plate into the wing. In an alternative embodiment, the first plate, the second plate and the wedge plate are inserted into wing prior to forming the cavities in the first plate, the second plate and the wedge plate. In such an embodiment, the device-retention cavity may be formed by drilling a hole in the wall structure of the wing, and in the first plate, the second plate and the wedge plate in block 505.

Embodiments of the invention encompass an in-wing device-retention assembly formed in any type of wing, including a fixed wing or a rotary wing, such as a rotor blade of a helicopter. By providing multiple pieces that stack on top of each other, a device may be provided in a narrow portion of the wing without drilling through one side of the wing and into an opposite side, maintaining the structural integrity of the wing.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of forming an in-wing device-retention assembly, comprising:
   inserting a first plate into a cavity of a wing, the wing having a wide end and a narrow end, the wing having an upper wall structure and an opposing lower wall structure that define the cavity, the first plate being positioned adjacent to the upper wall structure;
   inserting a second plate into the cavity, the second plate being positioned adjacent to the lower wall structure;
   inserting a wedge plate into the cavity and positioning the wedge plate between the first plate and the second plate, wherein the wedge plate has a wide end and a narrow end, and the wedge plate tapers from the wide end to the narrow end; and
   applying a force to the wedge plate in a direction toward the narrow end to fix the first plate, the second plate and the wedge plate within the wing, the applying the force to the wedge plate creating a force outwards against the upper wall structure and the lower wall structure; and
   wherein applying the force to the wedge plate aligns the first plate, the second plate, and the wedge plate to define a device-retention-cavity within which a sensor is receivable.

2. The method of claim 1, wherein the first plate includes a first opening, the second plate includes a second opening, the wedge plate includes a third opening and one of the upper wall structure and the lower wall structure of the wing includes a fourth opening, and
   fixing the first plate, the second plate and the wedge plate within the wing includes aligning the first opening, second opening, third opening and fourth opening to form a device-retention cavity.

3. The method of claim 1, wherein applying the force to the wedge plate includes pulling the wedge plate toward the narrow end of the wing.

4. The method of claim 1, wherein pulling the wedge plate toward the narrow end of the wing includes inserting a pulling mechanism into an opening in the narrow end of the wing, attaching the pulling mechanism to a portion of the wedge plate protruding from between the first and second plates and pulling the wedge plate toward the opening.

5. The method of claim 1, wherein applying the force to the wedge plate includes pushing the wedge plate toward the narrow end of the wing.

6. The method of claim 1, further comprising:
   after fixing the first plate, the second plate and the wedge plate within the wing, drilling into a side of one of the upper wall structure and the lower wall structure to form a device-retention cavity in the first plate, the second plate, the wedge plate and the one of the upper wall structure and the lower wall structure.

7. The method of claim 1, wherein the first plate, the second plate and the wedge plate are inserted into the narrow end of the wing.

8. The method of claim 7, wherein fixing the first plate, the second plate and the wedge plate within the wing includes fixing the first plate, the second plate and the wedge plate closer to the narrow end of the wing than the wide end of the wing.

9. The method of claim 1, wherein the wing is a rotor blade.

10. An in-wing device-retention assembly, comprising:
    a first plate;
    a second plate; and
    a wedge plate having a wide end and a narrow end such that the wedge plate tapers from the wide end to the narrow end, the wedge plate configured to be positioned between the first plate and the second plate in a cavity defined by an upper wall structure and an opposing lower wall structure of a wing, the first plate being positioned adjacent to the upper wall structure and the second plate being positioned adjacent to the lower wall structure, the wedge plate being configured to fix the first plate, the second plate and the wedge plate in the wing by applying a force outwards against the upper wall structure and the lower wall structure, wherein the first plate, second plate, and wedge plate align to form a device-retention-cavity within which a sensor is receivable.

11. The in-wing device-retention assembly of claim 10, wherein the first plate includes a first opening, the second plate includes a second opening, the wedge plate includes a third opening and one of the upper wall structure and the lower wall structure of the wing includes a fourth opening, the first opening, the second opening, the third opening and the fourth opening forming a device-retention cavity.

12. The in-wing device-retention assembly of claim 11, wherein the first plate includes a wall portion between the first opening and one of the upper wall structure and the lower wall structure of the wing, the wall portion defining an end of the device-retention cavity.

13. The in-wing device-retention assembly of claim 11, wherein the third opening has a diameter greater than a diameter of the first opening and the second opening.

14. The in-wing device-retention assembly of claim 10, wherein the wing includes a wide end and a narrow end, and the wedge plate has a wide end and a narrow end, the wedge plate configured to fix the first plate, the second plate and the wedge plate in the wing such that the wide end of the wedge plate faces the wide end of the wing and the narrow end of the wedge plate faces the narrow end of the wing.

15. The in-wing device-retention assembly of claim 14, wherein the wedge plate includes a protruding portion that extends past an outer surface of the first and second plates toward the narrow end of the wing.

16. The in-wing device-retention assembly of claim 10, wherein the wing is a rotor blade.

* * * * *